United States Patent [19]
Mosdal

[11] Patent Number: 5,762,436
[45] Date of Patent: Jun. 9, 1998

[54] MOUNTING BRACKET FOR MULTIPLE FRAME SIZES

[75] Inventor: Brian Thomas Mosdal, Ankeny, Iowa

[73] Assignee: Deere & Company, Moline, Ill.

[21] Appl. No.: 775,390

[22] Filed: Dec. 31, 1996

[51] Int. Cl.⁶ .................................................. A01B 15/14
[52] U.S. Cl. ............................ 403/3; 403/233; 403/235; 403/386; 403/398
[58] Field of Search ........................ 403/3, 4, 400, 403/399, 398, 386, 235, 233, 256, 258, 13; 172/776

[56] References Cited

U.S. PATENT DOCUMENTS

| | | | |
|---|---|---|---|
| 313,019 | 2/1885 | Packer | 403/398 |
| 382,435 | 5/1888 | Packer | 403/3 |
| 856,200 | 6/1907 | Allin et al. | 403/233 |
| 2,540,408 | 2/1951 | Saxe | 403/13 |
| 3,016,253 | 1/1962 | Launder | 403/398 |
| 3,743,029 | 7/1973 | Mills | 172/776 X |
| 5,632,567 | 5/1997 | Lowe et al. | 403/3 |

FOREIGN PATENT DOCUMENTS 1588345  4/1981  United Kingdom ............ 403/400

*Primary Examiner*—Anthony Knight

[57] ABSTRACT

A toolbar bracket assembly for mounting an agricultural rig or row unit on different toolbars includes a bracket having a pair of upright fore-and-aft extending plates with stepped cutouts or notches defining at least two toolbar-receiving areas of different sizes. The plates are supported in parallel relationship by a transversely extending upright connecting plate which is apertured to receive U-bolts or the bolts of a strap assembly which conform to the dimensions of the toolbar. A larger notched area is defined for embracing a portion of a toolbar of first cross section. A second smaller notched area is defined at a location centered with respect to the larger area for embracing a portion of a toolbar with a smaller cross section. The bracket can be attached to either toolbar by simply using a correctly sized U-bolt or a bolt and strap assembly.

18 Claims, 3 Drawing Sheets

MOUNTING BRACKET FOR MULTIPLE FRAME SIZES

BACKGROUND OF THE INVENTION

1) Field of the Invention

The present invention relates generally to mounting brackets for agricultural implements and, more specifically, to a single mounting bracket for attaching structure such as an agricultural rig or row unit to toolbar frames of differing sizes.

2) Related Art

Trailing rigs or row units for agricultural tillage or seeding implements often are mounted by brackets to transversely extending toolbars for forward movement over the ground. The toolbars have a rectangular cross section, the dimensions of which may vary from implement to implement. To provide good rig or unit stabilization, the brackets have a notched cutout to fit securely around the toolbar. However, the variations in toolbar cross section require a separate bracket for each different toolbar cross section if stabilization is to be achieved for each toolbar size. The different brackets increase the number of parts and manufacturing costs. Without a bracket stabilizing notch for each toolbar cross section, rig or unit location and trailing characteristics can be adversely affected.

BRIEF SUMMARY OF THE INVENTION

It is therefore an object of the present invention to provide an improved bracket assembly for an agricultural rig or row unit. It is another object to provide such an assembly which overcomes the above-mentioned problems.

It is another object of the present invention to provide an improved bracket assembly which provides good stabilization for a trailing rig or row unit. It is yet another object to provide such an assembly which can be attached to toolbars of more than one size without need for a separate bracket for each toolbar size.

It is another object to provide an improved bracket assembly for toolbars of different cross sections which includes a stabilizing, notched cutout. It is a further object to provide a single bracket for such an assembly that can be attached simply to different sizes of toolbars using sized U-bolts or a strap and bolt structure and wherein the cutout provides stabilization on each of the different sized toolbars.

A toolbar bracket assembly for mounting a rig, row unit or the like, includes a bracket having a pair of upright fore-and-aft extending plates with stepped cutouts or notches defining at least two toolbar-receiving areas of different sizes. The plates are supported in parallel relationship by a transversely extending upright connecting plate which is apertured to receive U-bolts or the bolts of a strap assembly which conform to the dimensions of the toolbar. A larger area is defined for embracing a portion of a toolbar of first cross section. A second smaller area is defined at a location centered and recessed with respect to the larger area for embracing a portion of a toolbar with a smaller cross section. The bracket can be attached to either toolbar by simply using the correct size of U-bolt or bolt and strap assembly. The notches provide rig or row unit stabilization and vertical centering for each toolbar size without need for a separate bracket for each size. The design is simple and inexpensive and reduces the number of parts that have to be manufactured and stocked for providing a stabilizing bracket structure for different sizes of toolbars. The second area is centered in the vertical direction relative to the first area and maintains a substantially constant vertical relationship between the bracket and the centerline of the toolbar regardless of which toolbar is selected so that operating characteristic of the tools on the rig or row unit remain substantially constant for each of the toolbars.

These and other objects, features and advantages of the present invention will become apparent to one skilled in the art upon reading the following detailed description in view of the drawings.

DETAILED DESCRIPTION OF THE DRAWINGS

Figure 1:
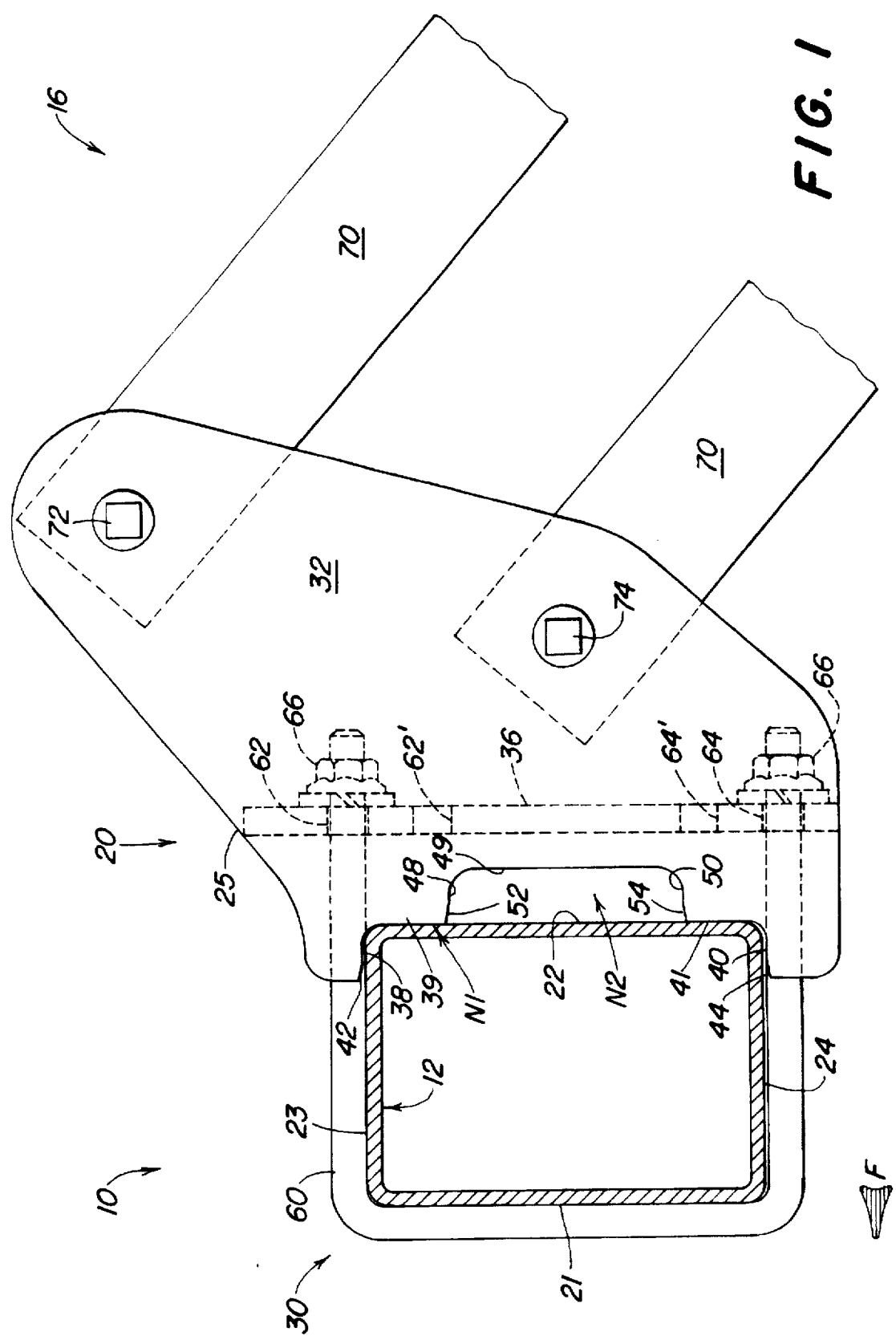
FIG. 1 is a side view of a portion of a row unit rig connected by a bracket assembly to a first to toolbar of rectangular configuration.

Referring now to FIG. 1, therein is shown a portion of a ground engaging agricultural implement 10 having a transversely extending toolbar 12 supported for forward movement (F) over the ground by a tractor or implement frame support (not shown). A ground engaging row unit or rig, a portion of which is shown generally at 16 in FIG. 1, is supported from the toolbar 12 by a bracket assembly 20.

Figure 2:
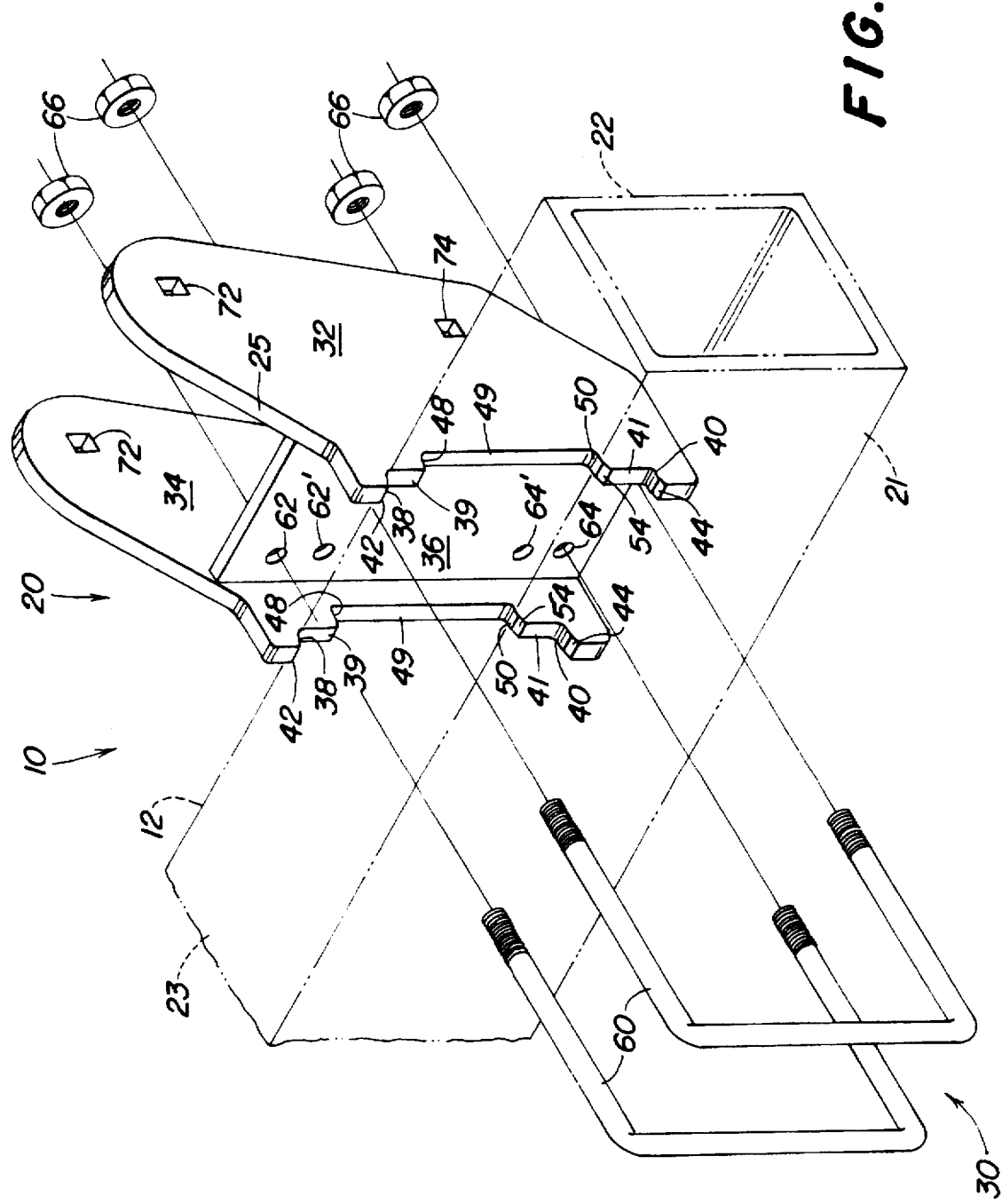
FIG. 2 is a perspective view of the bracket assembly of FIG. 1 with the first toolbar shown by broken lines.
Figure 3:
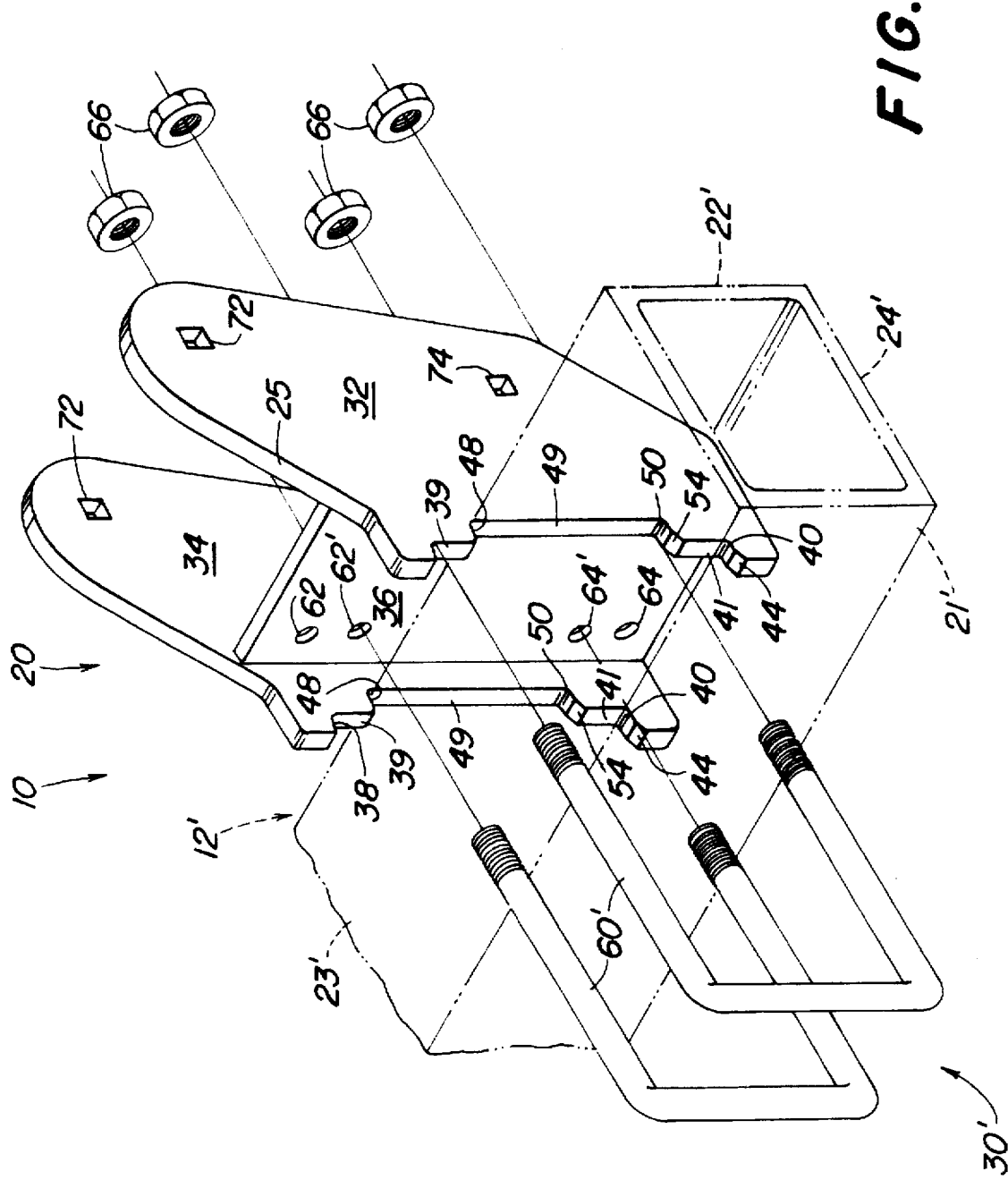
FIG. 3 is a view similar to FIG. 2 but showing the bracket assembly supporting a second toolbar which has a vertical dimension less than that of the first toolbar.

The toolbar 12 is rectangular in cross section and includes forward and aft vertical faces 21 and 22 connected by top and bottom walls 23 and 24. In FIG. 3, the toolbar 12' has a different cross section with the faces 21' and 22' being of smaller vertical dimension than the corresponding faces 21 and 22 on the toolbar 12 of FIGS. 1 and 2. The bracket assembly 20 facilitates mounting of the row unit or rig 16 from either toolbar 12 or 12'.

The bracket assembly 20 includes a main connector portion 25 mounted against the aft face 22 and the top and bottom walls 23 and 24 and secured there by a bolt or strap assembly 30. The main connector portion 25 as shown in FIGS. 1–3 includes first and second generally identical upright notched plates 32 and 34 and an upright apertured plate 36 connected to and extending transversely between the plates 32 and 34. The plate 36 is welded to and supports the plates 32 and 34 in parallel, transversely spaced relationship.

The plates 32 and 34 include first and second stabilizing notched portions (see N1 and N2 of FIG. 1) extending forwardly from the plate 36. The first stabilizing notched portions N1 include upper horizontal and vertical abutting surfaces 38, 39 and lower corresponding abutting surfaces 40, 41. The spacing between the horizontal surfaces 38 and 40 is approximately equal to the spacing between the top and bottom walls 23 and 24 of the toolbar 12. The horizontal abutting surfaces 38 and 40 diverge in the forward direction at locations 42 and 44, respectively, to help channel the main connector portion 25 into position relative to the toolbar 12 (FIG. 1) and facilitate a close fit between the bracket assembly 20 and the toolbar. The horizontal surfaces 38 and 40 project forwardly a relatively short distance from the rear corners of the toolbar 12 to precisely locate the bracket assembly 20 vertically relative to the toolbar. The vertical abutting surfaces 39 and 41 abut the aft face 22 of the toolbar 12 to help maintain the desired angular relationship between the bracket assembly and the toolbar.

The second stabilizing notched portions N2, recessed and centered with respect to but smaller in height than the first notched portions N1, include upper and lower horizontal abutting surfaces 48 and 50 connected by rear abutting surfaces 49 to define notches conforming to the shape of the aft portion of the toolbar 12' (FIG. 3). The horizontal abutting surfaces 48 and 50 diverge in the forward direction at locations 52 and 54 to help channel the main connector portion 25 into position relative to the toolbar 12'. The second stabilizing notched portion provides precise locating and good stabilizing of the bracket assembly 20 on the toolbar 12' in a manner similar to that described above for the toolbar 12 without need for a separate main connector portion for the different sized toolbar 12'. The relatively small fore-and-aft offset of each of the notched portions, which preferably is less than a fourth of the fore-and-aft dimension of the toolbar 12 or 12', assures that the horizontal surfaces adequately extend beyond the toolbar corners and embrace the top and bottom walls of the toolbar while minimizing the fore-and-aft dimension of the main connector portion 25 and reducing the rearward offset of the plate 36 from the aft face of the selected toolbar 12 or 12'. The second notched portion N2 is centered in the vertical direction relative to the first notched portion N2 and maintains a substantially constant vertical relationship between the main connector portion 25 and the centerline of the toolbar regardless of whether the bracket assembly 20 is connected first toolbar 12 or second toolbar 12'.

The assembly 30 attaching the bracket assembly 20 to the toolbar 12 is shown as a pair of U-bolts 60 conforming to the shape of the first toolbar 12 and extending through upper and lower apertures 62 and 64 in the plate 36. The apertures 62 and 64 are generally aligned (FIG. 1) with the horizontal abutting surfaces 38 and 40. The U-bolts are secured by nuts 66 which firmly draw the bracket assembly 20 into secure and precise alignment relative to the toolbar 12. Spaced inwardly from the apertures 62 and 64 are apertures 62' and 64' for receiving the threaded ends of U-bolts 60' (FIG. 3) which conform to the second toolbar 12' and are generally aligned (FIG. 1) with the horizontal surfaces 48 and 50. Although U-bolts are shown, straps and bolts may also be used to connect the assemblies 30 and 30' to the toolbars.

The bracket assembly 20 as shown in FIG. 1 pivotally supports row unit links 70 between the plates 32 and 34 at locations 72 and 74. The above-described design allows the same main connector portion to be used on different sizes of toolbar frames while providing excellent stability and precise location of the trailing rig or unit on each of the toolbars.

Having described the preferred embodiment, it will become apparent that various modifications can be made without departing from the scope of the invention as defined in the accompanying claims.

I claim:

1. An agricultural mounting assembly for use alternatively with first and second toolbars of different rectangular cross section adapted for forward movement over the ground, the toolbars extending substantially horizontally and transversely to the forward direction and including forward and aft faces and top and bottom walls connected by front and rear corners, wherein the top and bottom walls of the first toolbar are spaced a first distance apart and the top and bottom walls of the second toolbar are spaced a second distance apart, the second distance being less than the first distance, the mounting assembly comprising:

first and second upright fore-and-aft extending plates;

a transverse connecting member supporting the upright plates in transversely spaced and generally parallel relationship;

the first and second plates including colinear notched portions defining a first fore-and-aft extending toolbar receiving area having first upper and lower horizontal fore-and-aft surfaces spaced the first distance apart and rear surfaces for supporting the first toolbar transversely with respect to the first and second plates, and a second fore-and-aft extending toolbar receiving area having second upper and lower horizontal surfaces spaced the second distance apart and rear surfaces for supporting the second toolbar transversely with respect to the first and second plates; and bolt structure selectively securing the plates against a selected one of the toolbars, with the first toolbar receiving portion embracing the toolbar with the toolbar extending transversely and horizontally when the toolbar with the top and bottom walls spaced the first distance apart is selected, and with the second toolbar receiving portion embracing the toolbar with the toolbar extending transversely and horizontally when the toolbar with the top and bottom walls spaced the second distance apart is selected, the first and second toolbar receiving portions providing stabilization of the plates on the first and second toolbars, respectively.

2. The invention as set forth in claim 1 wherein the second toolbar receiving area is centered and recessed with respect to the first toolbar receiving area.

3. The invention as set forth in claim 1 wherein when the first toolbar is selected the first upper and lower horizontal surfaces extend rearwardly around the aft corners of the first toolbar, the first toolbar receiving portion including a vertical surface adapted for abutting the aft face of the first toolbar.

4. The invention as set forth in claim 3 wherein the first toolbar receiving portion includes a diverging ramp portion connected to the first upper and lower horizontal surfaces for guiding the upright plates into embracing relationship with the first horizontal surfaces.

5. The invention as set forth in claim 3 wherein the second toolbar receiving portion is recessed with respect to the vertical surface of the first toolbar receiving portion.

6. The invention as set forth in claim 5 wherein the first and second toolbar receiving portions have respective fore-and-aft offsets less than approximately a fourth of the spacing between the forward and aft faces of the first and the second toolbars.

7. The invention as set forth in claim 1 wherein the transverse connecting member includes apertures generally aligned with the horizontal surfaces for receiving the bolt structure.

8. The invention as set forth in claim 7 wherein the bolt structure comprises first and second U-bolts having dimensions corresponding to the cross sections of the first and the second toolbars, respectively.

9. The invention as set forth in claim 1 wherein the first upper and lower horizontal surfaces have a length substantially less than a fourth of a fore-and-aft dimension corresponding to the distance between the forward and aft faces of the toolbar, and wherein the transverse connecting member is planar and offset rearwardly adjacent the second toolbar receiving portion.

10. An agricultural mounting assembly for use alternatively with first and second toolbars of first and second differing rectangular cross section, respectively, the toolbars adapted for forward movement over the ground in a substantial horizontal attitude transverse to the forward direction and including forward and aft walls and top and bottom walls connected by front and rear corners, the mounting assembly comprising:

a main upright bracket having first and second notched portions, the first notched portion defining a first toolbar receiving area conforming to a portion of the first cross section, and the second notched portion defining a second toolbar receiving area conforming to a portion of the second cross section, the first notched portion including a rear wall portion lying substantially along a transverse upright plane and a first horizontal abutting surface, and wherein the second notched portion is recessed from the rear wall portion and includes rear abutting surfaces lying substantially parallel to the transverse upright plane and a second horizontal abutting surface; and connecting structure selectively securing one of the notched portions against a selected one of the first and second toolbars, the first notched portion embracing the first toolbar and supporting the first toolbar against the rear wall portion and first horizontal abutting surface in a horizontal attitude transverse to the forward direction when the first toolbar is selected, and the second notched portion embracing the second toolbar and supporting the second toolbar against the rear abutting surfaces and second horizontal abutting surface in a horizontal attitude transverse to the forward direction when the second toolbar is selected, the first and second toolbar receiving portions providing stabilization of the main upright bracket on the first and second toolbars, respectively.

11. The invention as set forth in claim 10 wherein the second notched portion is centered vertically with respect to the first notched portion.

12. The invention as set forth in claim 10 wherein the main upright bracket comprises a pair of upright notched plates which lie substantially in a fore-and-aft extending plane.

13. The invention as set forth in claim 12 wherein the main upright bracket includes a plate member extending transversely between the notched plates and offset in the fore-and-aft direction from the second notched portion.

14. The invention as set forth in claim 13 wherein the connecting structure comprises first and second U-bolts conforming to the first and second cross sections, respectively, and wherein the plate member includes apertured portions for receiving the U-bolts.

15. The invention as set forth in claim 10 wherein the toolbars each have a preselected fore-and-aft dimension, and the first notched portion is recessed in the connecting structure a distance less than approximately a fourth of the preselected fore-and-aft dimension of the first toolbar.

16. The invention as set forth in claim 15 wherein the second notched portion is recessed from the first notched portion a distance less than approximately a fourth the preselected fore-and-aft dimension of the second toolbar.

17. The invention as set forth in claim 16 wherein the second notched portion is centered with respect to the first notched portion in the vertical direction.

18. An agricultural mounting assembly for use with either first or second toolbars of different rectangular cross section adapted for support by fore-and-aft extending links for forward movement over the ground, the toolbars extending substantially horizontally and transversely to the forward direction and including forward and aft faces and top and bottom walls connected by front and rear corners, wherein the top and bottom walls of the first toolbar are spaced a first distance apart and the top and bottom walls of the second toolbar are spaced a second distance apart, the second distance being less than the first distance, the mounting assembly comprising:

upright fore-and-aft extending plates;

a connecting member supporting the upright plates in transversely spaced and generally parallel relationship, wherein the upright plates have transversely spaced portions adapted for receiving the links therebetween;

the plates including notched portions defining a first fore-and-aft extending toolbar receiving area having first upper and lower horizontal fore-and-aft surfaces spaced the first distance apart and rear surfaces for supporting the first toolbar horizontally and transversely with respect to the plates, and a second fore-and-aft extending toolbar receiving area having second upper and lower horizontal surfaces spaced the second distance apart and rear surfaces for supporting the second toolbar horizontally and transversely with respect to the plates; and bolt structure securing the plates against a selected one of the toolbars, with the first toolbar receiving portion embracing the toolbar with the toolbar extending transversely and horizontally when the toolbar with the top and bottom walls spaced the first distance apart is selected, and with the second toolbar receiving portion embracing the toolbar with the toolbar extending transversely and horizontally when the toolbar with the top and bottom walls spaced the second distance apart is selected.

* * * * *